(12) United States Patent
Needham et al.

(10) Patent No.: US 12,127,508 B2
(45) Date of Patent: Oct. 29, 2024

(54) SENSOR MOUNT AND ASSEMBLY FOR A TIMBER-WORKING DEVICE

(71) Applicant: Deere & Company, Moline, IL (US)

(72) Inventors: Jemma Lee Needham, Whakamaru (NZ); Eden Zamir Rafealov, Gothenburg (SE); Douglas Craig Swinyard, Rotorua (NZ)

(73) Assignee: DEERE & COMPANY, Moline, IL (US)

( * ) Notice: Subject to any disclaimer, the term of this patent is extended or adjusted under 35 U.S.C. 154(b) by 1335 days.

(21) Appl. No.: 16/622,409

(22) PCT Filed: Jun. 15, 2018

(86) PCT No.: PCT/NZ2018/050081
§ 371 (c)(1),
(2) Date: Dec. 13, 2019

(87) PCT Pub. No.: WO2018/231074
PCT Pub. Date: Dec. 20, 2018

(65) Prior Publication Data
US 2020/0205356 A1   Jul. 2, 2020

(30) Foreign Application Priority Data

Jun. 15, 2017   (NZ) .............................. 20170732896

(51) Int. Cl.
*G01B 7/04*    (2006.01)
*A01G 23/083*  (2006.01)
(Continued)

(52) U.S. Cl.
CPC ............ *A01G 23/083* (2013.01); *B27B 25/00* (2013.01); *B27L 1/00* (2013.01); *E02F 9/264* (2013.01);
(Continued)

(58) Field of Classification Search
CPC .......... B27B 25/00; E02F 9/264; E02F 3/963; F16M 13/00; G01D 11/245; G01L 19/147;
(Continued)

(56) References Cited

U.S. PATENT DOCUMENTS

| 4,771,637 A | 9/1988 | Kubler |
| 6,396,163 B1 | 5/2002 | Sugiura et al. |

(Continued)

FOREIGN PATENT DOCUMENTS

| DE | 102012022661 A1 * | 5/2014 | ............. F16H 57/01 |
| EP | 2489978 A1 * | 8/2012 | ........... A01G 23/083 |
| WO | 2017059837 A1 | 4/2017 | |

OTHER PUBLICATIONS

Axis Forestry Inc, Photo Eye Assembly and Upgrade to Laser Diagram, https://axisforestry.com/diagram/424, undated, admitted prior art.

(Continued)

*Primary Examiner* — Robert R Raevis

(74) *Attorney, Agent, or Firm* — KLINTWORTH & ROZENBLAT IP LLP

(57) ABSTRACT

A sensor mount for use with a timber-working device includes a monolithic structure having a base portion configured to be secured to a frame of a timber-working device, and a sensor mounting portion including a cavity configured to receive a contactless sensor. The cavity has a sensor mounting surface for securing the contactless sensor thereto.

20 Claims, 6 Drawing Sheets

(51) Int. Cl.
- *B27B 25/00* (2006.01)
- *B27L 1/00* (2006.01)
- *E02F 9/26* (2006.01)
- *F16M 13/00* (2006.01)
- *G01D 11/24* (2006.01)
- *G01L 19/14* (2006.01)
- *A01G 23/081* (2006.01)
- *A01G 23/091* (2006.01)
- *A01G 23/095* (2006.01)

(52) U.S. Cl.
CPC ............... *F16M 13/00* (2013.01); *G01B 7/04* (2013.01); *G01D 11/245* (2013.01); *G01L 19/147* (2013.01); *A01G 23/081* (2013.01); *A01G 23/091* (2013.01); *A01G 23/095* (2013.01)

(58) Field of Classification Search
CPC .. A01G 23/081; A01G 23/091; A01G 23/095; A01G 23/087
USPC ...... 73/493, 494, 596–643, 655, 657, 866.5; 356/5.01–5.8; 144/336–339, 34.1–34.6, 144/24.13
See application file for complete search history.

(56) References Cited

U.S. PATENT DOCUMENTS

2014/0096870 A1    4/2014   Kaye et al.
2017/0079220 A1*   3/2017   Hunt .................... A01G 23/091

OTHER PUBLICATIONS

International Search Report for PCT/NZ2018/050081, dated Sep. 24, 2018, 4 pages.
Written Opinion of the International Searching Authority for PCT/NZ2018/050081, dated Sep. 24, 2018, 6 pages.

* cited by examiner

SENSOR MOUNT AND ASSEMBLY FOR A TIMBER-WORKING DEVICE

CROSS-REFERENCE TO RELATED APPLICATIONS

The present application is a U.S. national stage entry under 35 U.S.C. § 371 based on International Application No. PCT/NZ2018/050081, filed 15 Jun. 2018, the contents of which are hereby incorporated by reference in their entirety.

TECHNICAL FIELD

The present disclosure relates to a sensor assembly and sensor mount for same, more particularly for use with a timber-working device.

BACKGROUND

It is known to mount a timber-working head, for example in the form of a harvesting head, to a forestry work machine to perform a number of functions in connection with timber. Such heads may be used to grapple and fell a standing tree and process the felled tree by delimbing, possibly debarking (depending on the configuration of the head), and cutting the stem of the tree into logs of predetermined length using at least one chainsaw. Feeding the stem along its length relative to the head is typically achieved using arm mounted rotary drives having a feed wheel at the end of opposing drive arms configured to grasp the stem, together with at least one frame mounted feed wheel.

Once a tree has been felled, or on picking up a previously felled stem, the first step in processing is usually to feed the stem through to one end. It is known to use an optical sensor mounted to the head to automatically detect an end of the stem as it passes. Such sensors are subjected to harsh operating conditions, particularly vibration, which can impact the service life.

Further aspects and advantages of the present disclosure will become apparent from the ensuing description which is given by way of example only.

SUMMARY OF THE DISCLOSURE

According to an example embodiment of the present disclosure there is provided a sensor mount. The sensor mount may include a monolithic structure. The monolithic structure may include a base portion configured to be secured to a frame of a timber-working device. The monolithic structure may include a sensor mounting portion including a cavity configured to receive a contactless sensor, the cavity having a sensor mounting surface for securing the contactless sensor thereto.

According to an example embodiment of the present disclosure there is provided a sensor mount. The sensor mount may include a base portion configured to be secured to a frame of a timber-working device. The sensor mount may include a sensor mounting portion including a cavity configured to receive a contactless sensor, the cavity having a sensor mounting surface for securing the contactless sensor thereto. The base portion and the sensor mounting portion may be configured to avoid resonance with vibration induced by operation of the timber-working device. The base portion and the sensor mounting portion may be configured to have a resonance frequency outside the range of about 500 Hz to about 1100 Hz.

According to an example embodiment of the present disclosure there is provided a sensor assembly. The sensor assembly may include a sensor mount substantially as herein described. The sensor assembly may include a contactless sensor secured within the cavity of the sensor mount.

According to an example embodiment there is provided a timber-working device, including a frame, a feed mechanism configured to feed at least one stem relative to the frame. The timber-working device includes a sensor assembly substantially as herein described, mounted to the frame such that a sensing path of the sensor projects into a feed path of the feed mechanism.

According to an example embodiment of the present disclosure there is provided a method of manufacturing a sensor mount assembly. The method may include the step of producing a monolithic structure including a base portion configured to be secured to a frame of a timber-working device, and a sensor mounting portion including a cavity having a sensor mounting surface. The method may include the further step of positioning the contactless sensor within the cavity and securing it to the sensor mounting surface.

Reference to the sensor mount including a monolithic structure should be understood to mean that the various portions of this structure are manufactured as a single part, rather than fabrication from multiple pieces. The inventors have identified potentially problematic behavior in sensor mounts with regard to vibration in the range of 500 Hz to 1100 Hz, more particularly within the range of about 600 Hz to about 1000 Hz, and even more particularly centered about 800 Hz. The inventors believe that the fabrication processes used to manufacture existing sensor mounts for timber-working devices from multiple pieces may result in distortion of the materials particularly the mounting base bearing against the frame of the timber-working device which may contribute to increased vibration within such units. Further, the thin plate materials and welded joins of such fabrications are believed to potentially lead to resonance and amplification of the damaging effects of vibrations. The inventors envisaged that the monolithic structure may assist in reducing the likelihood of such effects occurring in the sensor mount of the present disclosure. In example embodiments one or more additional components of the sensor mount described herein may be integral with the monolithic structure, while in other example embodiments they may be manufactured separately and secured thereto.

Manufacture of the monolithic structure may be achieved, for example, by machining a single piece of material, additive manufacture, casting, or molding. It should be appreciated that suitability of a particular manufacturing technique may be influenced by the material selected for manufacture of the monolithic structure.

In an example embodiment the monolithic structure of the sensor mount may be manufactured of aluminum, or an alloy thereof. By way of example the monolithic structure may be manufactured of a 6000 series aluminum alloy and more particularly aluminum alloy 6062. However, it should be appreciated that this is not intended to be limiting. For example, in an example embodiment the monolithic structure of the sensor mount may be manufactured of another metal, or a plastics material.

In an example embodiment the base portion of the sensor mount may include at least one flange. In an example embodiment the base portion of the sensor mount may include a first flange to one side of the cavity, and a second flange to the other side of the cavity. In example embodiments the base portion may include frame mounting points, for example defined by fastener apertures in the at least one flange, through which fasteners such as bolts may be passed to engage with the frame of the timber-working device.

In an example embodiment, the thickness of the monolithic structure at the base portion may be at least 10 mm when made of an aluminum alloy, and more particularly at least 15 mm.

In an example embodiment the sensor mount may include a passage from the cavity to an external surface of the sensor mount. The passage may provide an opening in the mount for the emission of the electromagnetic field or beam of electromagnetic radiation from the sensor. In an example embodiment the passage may be enclosed. In an example embodiment, at least the side surfaces of the passage may taper outwardly from the cavity. It is envisaged by the inventors that this taper may reduce the likelihood of extraneous matter building up in the passage, or reaching the cavity. In an example embodiment the passage may be defined by the monolithic structure of the sensor mount.

Numerous sensing technologies are known in the art for contactless detection of the presence of material for example, detecting the end of a tree stem being processed by the timber-working device for example optical (such as a laser range finding, or a photocell), capacitive, or ultrasonic sensors. It should be appreciated that the present disclosure may have application to sensors for other uses, such as a camera or moisture sensor.

In an example embodiment the sensor may be a laser distance sensor such as the Keyence LR-TB2000C laser sensor. The inventors have identified that the sensor package of the LR-TB2000C may have an axis of loading more vulnerable to the effects of vibration and shock induced by operation of a timber-working device than other axes. The inventors have identified this as being the axis parallel with the mounting holes of the LR-TB2000C. In an example embodiment the sensor may be secured to the sensor mount such that the vulnerable axis is perpendicular to the highest forces subjected to it by the timber-working device, which the inventors believe to be along the feed axis along which the stem is fed. In such an embodiment, where the feed axis is the X-axis of the timber-working device, the vulnerable axis may be oriented along the Y-axis or the Z-axis of the timber-working device, and more particularly the Y-axis. Further, in doing so the LR-TB2000C may be oriented such that an inbuilt display faces away from the frame—allowing for the potential for the display to be more easily read. It should be appreciated that while orientation of the sensor is discussed regarding the configuration of the LR-TB2000C, the principles may be applied to other sensor packages having similar vulnerabilities.

In an example embodiment the sensor may be secured directly to the sensor mounting surface. In an example embodiment, an entire side of the sensor may bear against the sensor mounting surface when secured thereto. In an example embodiment, one or more fasteners may be passed through the sensor to engage fastener engagement apertures in the sensor mounting surface. It is envisaged that by directly engaging the monolithic structure, the potential for resonance in intermediary parts may be reduced.

In an example embodiment the sensor mount may include a sensor fastener access recess on the frame facing surface of the base portion and intersecting the cavity. Such a recess may assist with positioning a tool, such as a screwdriver, to access and drive a fastener used to secure the sensor. Similarly, in an example embodiment the sensor mount may include a sensor fastener access aperture into the cavity for accessing a fastener used to secure the sensor.

In an example embodiment it is envisaged that the sensor may be secured within the cavity using an adhesive, or a potting compound.

In an example embodiment the sensor mount may include a transparent portion permitting viewing of the sensor when the mount is secured to the frame of the timber-working device. For example, the sensor mount may include a viewing pane of transparent material secured over an opening into the cavity. It is envisaged that such a viewing pane may be secured in a position such that it does not contact the sensor, in order to reduce the likelihood of vibration induced in the viewing pane being transferred.

The above and other features will become apparent from the following description and the attached drawings.

BRIEF DESCRIPTION OF THE DRAWINGS

The detailed description of the drawings refers to the accompanying figures in which.

DETAILED DESCRIPTION

Figure 1A:
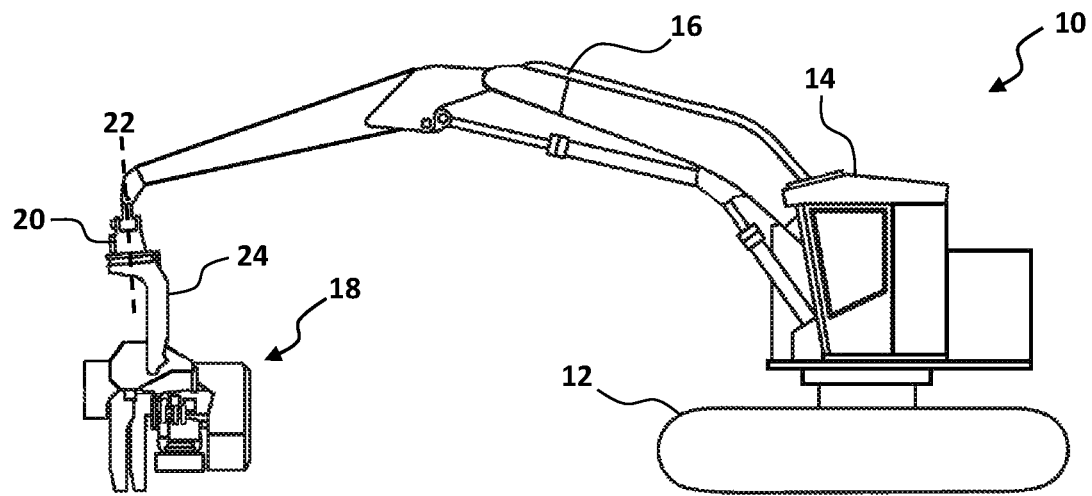
FIG. 1A is a side view of an example timber-working system including an example timber-working device in the form of a forestry head.

FIG. 1A illustrates a timber-working system (herein referred to as tracked harvester 10), for use in forest harvesting. The tracked harvester 10 includes a base carrier 12 includes an operator cab 14 from which an operator (not shown) controls the tracked harvester 10. A boom assembly 16 extends from the base carrier 12, to which a timber-working device in the form of a forestry head 18 is connected.

Connection of the head 18 to the boom assembly 16 includes a rotator 20, configured to rotate the head 18 about the generally vertical axis of rotation marked by dashed line 22. A tilt bracket 24 further allows rotation of the head 18 between a prone position (as illustrated) and a standing position.

Figure 1B:
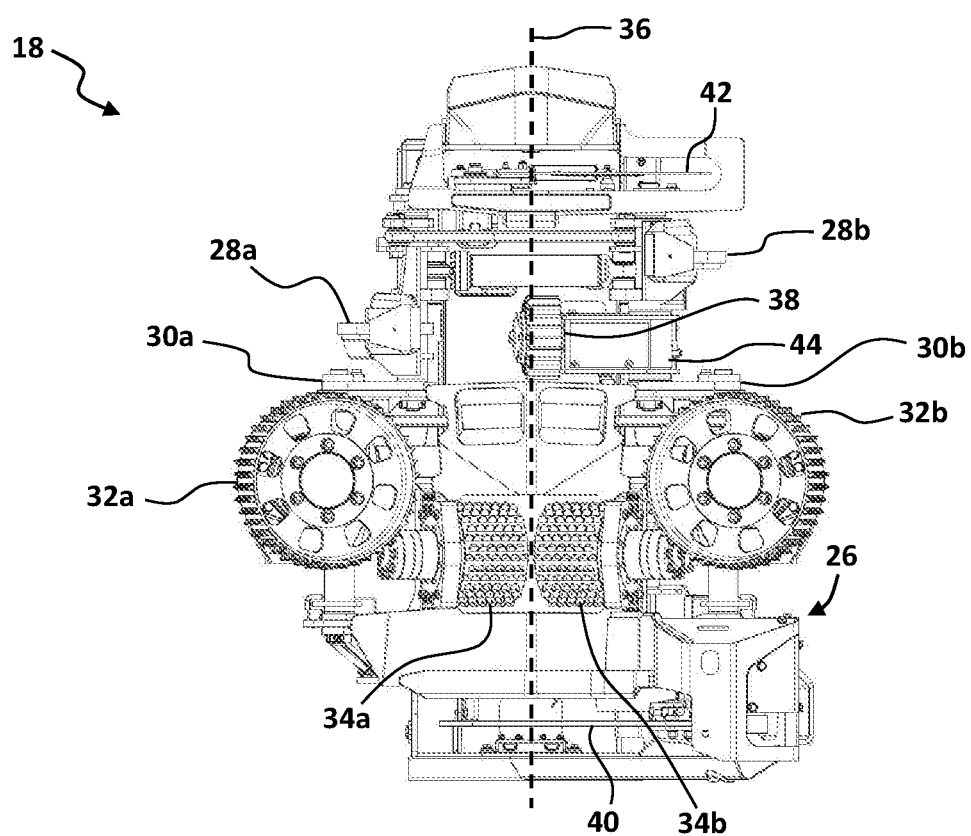
FIG. 1B is an elevated view of the example forestry head.

Referring to FIG. 1B, the head 18 includes a frame 26 to which the tilt bracket 24 of FIG. 1A is pivotally attached. Right hand (RH) and left hand (LH) delimb arms 28a and 28b are pivotally attached to the frame 26, as are opposing RH and LH feed arms 30a and 30b. RH and LH feed wheels 32a and 32b are attached to RH and LH feed arms 30a and 30b respectively, which together with RH and LH frame-mounted feed wheels 34a and 34b may be controlled to feed one or more stems (not illustrated) along a longitudinal feed axis 36 of the head 18. It should be appreciated that while the head 18 is illustrated as having two frame-mounted feed wheels, in example embodiments the head may have one frame-mounted feed wheel, or none, as known in the art. Feed wheels 32a, 32b, 34a and 34b may collectively be referred to as the "feed mechanism." It should be appreciated that reference to the feed wheels is intended to include the hydraulic rotary drives propelling them. A measuring wheel 38 may be used to measure the length of the stem as it passes.

A main chainsaw 40, and a topping chainsaw 42, are attached to the frame 26. The main saw 40 is typically used to fell a tree when the head 18 is in a harvesting position, and to buck stems into logs in the processing position of the head 18 (as seen in FIG. 1A). The topping saw 42 may be used to cut off a small-diameter top portion of the stem(s) to maximize the value recovery of the trees.

Figure 1C:
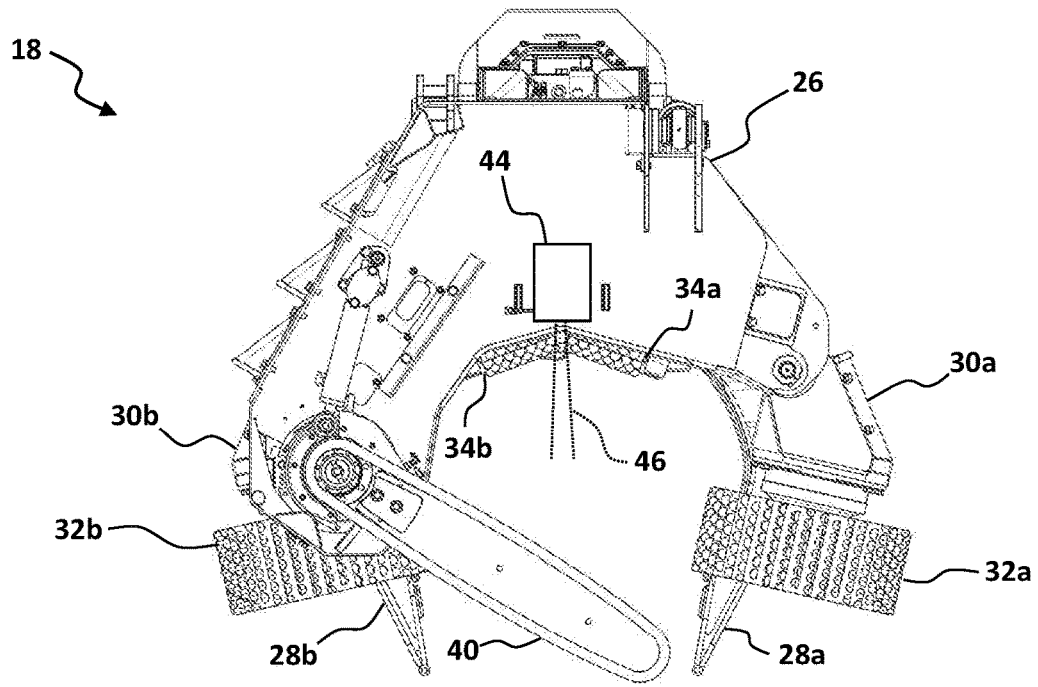
FIG. 1C is an end view of the example forestry head.

FIG. 1C illustrates the positioning of an end finding sensor assembly 44, having a laser distance measurement sensor with an associated sensing path 46 projecting beyond the frame 26 into the space between the delimb arms 28a and 28b, and feed wheels 32a and 32b.

Figure 2:
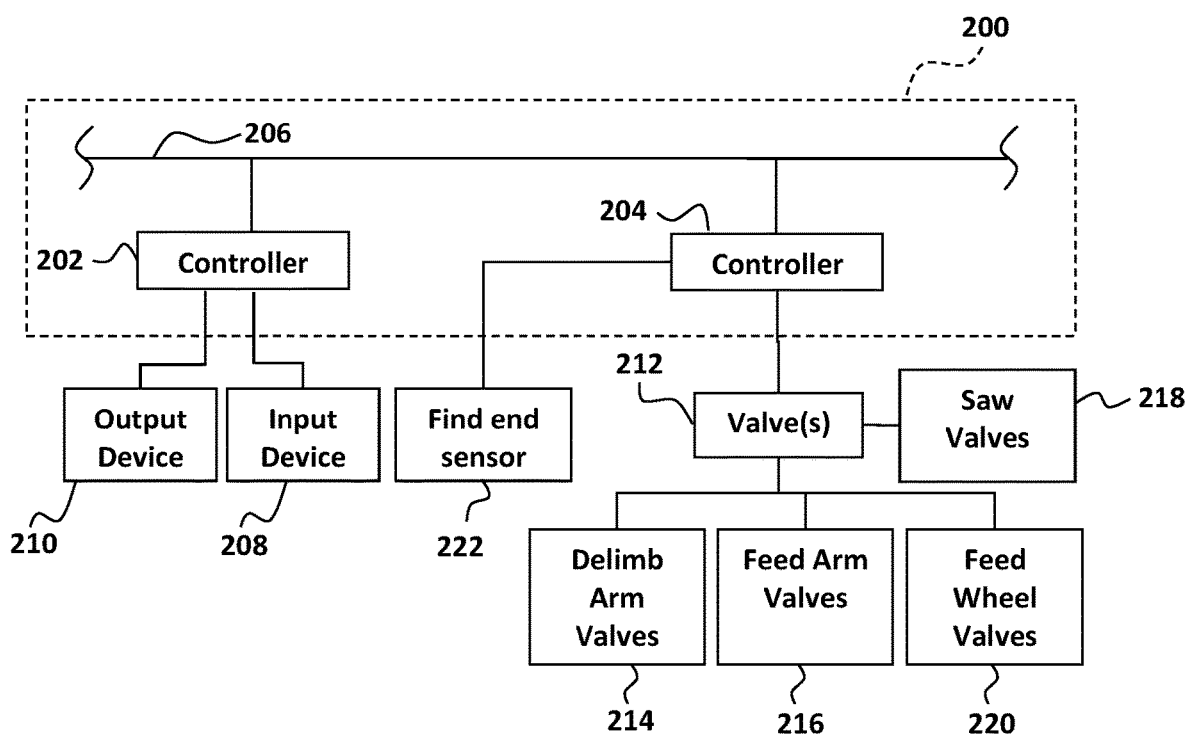
FIG. 2 is a diagrammatic view of an example control system for the timber-working system.

The various operations of the head 18 may be controlled by the operator using hand and foot controls as known in the art. Further, certain automated functions of the harvester head 18 may be controlled by an electronic control system 200 as shown by FIG. 2. The control system 200 includes one or more electronic controllers, each controller including a processor and memory having stored therein instructions which, when executed by the processor, causes the processor to perform the various operations of the controller. For example, the control system 200 includes a first controller 202 on board the carrier 12 and a second controller 204 on board the head 18. The controllers 202, 204 are connected to one another via a communications bus 206 (e.g., a CAN bus, or a wireless link). A human operator operates an operator input device 208, for example hand and foot controls, located at the operator's cab 14 of the carrier 12 to control the head 18. Details of operation are output to an output device 210 for example a monitor. Certain automated functions may be controlled by first controller 202 and/or second controller 204.

The head 18 has a number of valves 212 arranged, for example, in a valve block and coupled electrically to the second controller 204 so as to be under its control. The valves 212 include, for example, delimb arm valves 214 configured to control pivotal movement of the delimb arms 28a and 28b, and feed arm valves 216 configured to control pivotal movement of the feed arms 30a and 230b. The valves 212 also include, for example, saw valves 218, configured to control movement and operation of the main saw 40 and the topping saw 42. The valves 212 also include, for example, feed wheel valves 220, configured to control movement and operation of the rotary drives associated with wheels 32a, 32b, 34a and 34b.

The distance sensor 222 of the end finding sensor assembly 44 is configured to output signals to the second controller 204 indicative of the distance to the surface of one or more stems in the sensing path 46, thereby allowing for detection of the end of the stem.

Figure 3A:
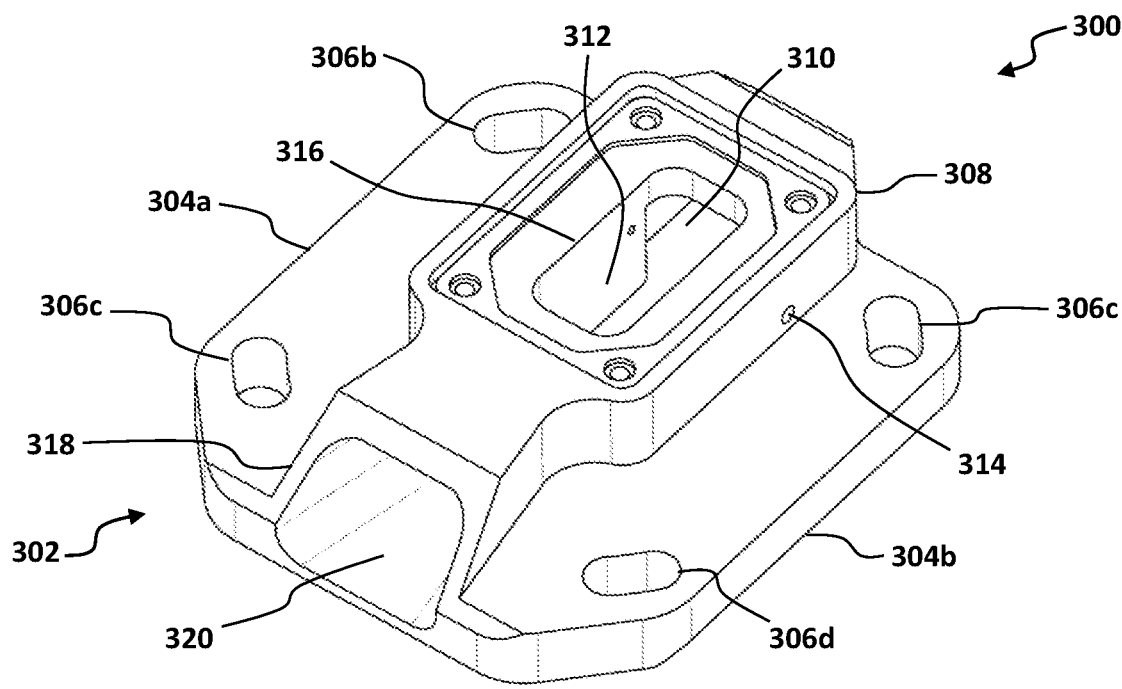
FIG. 3A is a first perspective view of an example monolithic structure of a sensor mount for use with the forestry head.

FIG. 3A an example sensor mount 300 which may be used in the end finding sensor assembly 44. The sensor mount 300 has a monolithic structure including a base portion 302 having a first flange 304a and a second flange 304b. The first flange 304a includes a first frame mounting aperture 306a and a second frame mounting aperture 306b, and the second flange 304b includes a third frame mounting aperture 306c and a fourth frame mounting aperture 306d, each configured to receive fasteners, such as bolts, for engaging with the frame 26 of the head 18.

The monolithic structure of the sensor mount 300 further includes a sensor mounting portion 308 having a cavity 310 with a sensor mounting surface 312 on the same side of the sensor mount 300 as the first flange 304a. The cavity 310 includes a fastener access aperture 314 in a side of the sensor mounting portion 308 opposing the sensor mounting surface 312, use of which will be described further below. In the example embodiment illustrated, the sensor mounting portion 308 includes a viewing opening 316 into the cavity 310.

The monolithic structure of the sensor mount 300 further includes a passage portion 318 defining a passage 320 between the cavity 310 and a front side of the sensor mount 300. Further detail of the passage 320 will be provided below.

Figure 3B:
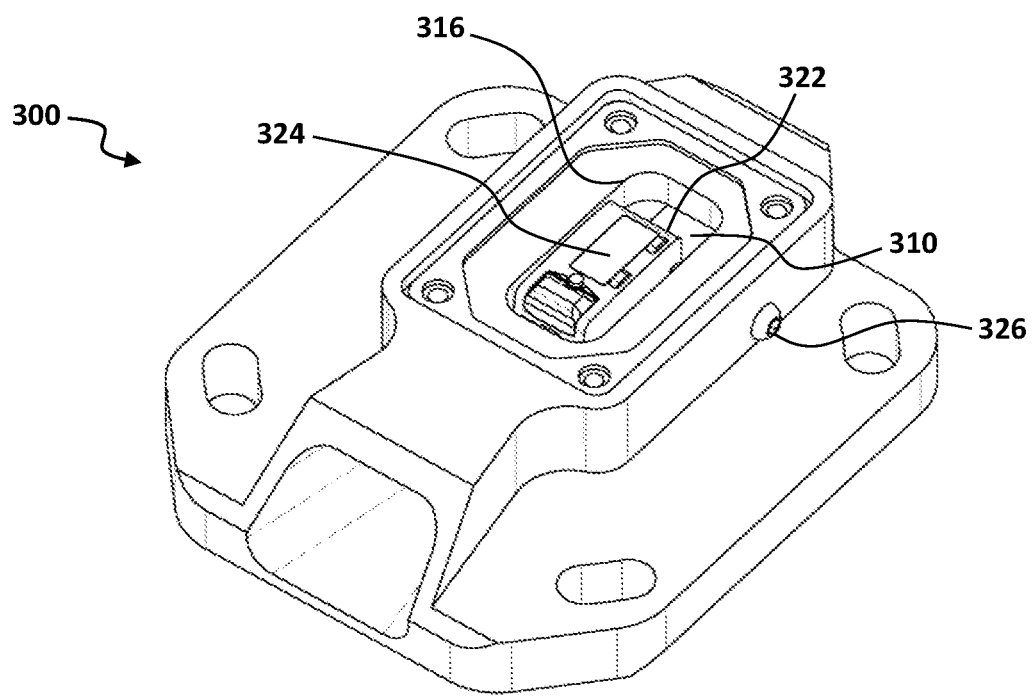
FIG. 3B is a second perspective view of the example sensor mount.

Referring to FIG. 3B, in the example embodiment illustrated a find end sensor 322 is secured directly to the sensor mounting surface 312, in a manner which will be described further below. In this example embodiment the find end sensor 322 may be a Keyence LR-TB2000C laser sensor. The find end sensor 322 includes a display 324 facing towards the viewing opening 316, which may display one or more of: range (maximum and minimum), current distance, error notifications. The inventors have identified that the sensor package of the LR-TB2000C may have an axis of loading more vulnerable to the effects of vibration and shock induced by operation of a timber-working device than other axes. In this orientation illustrated, it is believed that the effects of this may be reduced, with the find end sensor 322 secured to the sensor mounting surface 312 such that the vulnerable axis through the mounting holes of the sensor package is perpendicular to the feed axis 34 along which the stem is fed. While access to the fastener access aperture 314 is not required, it may be sealed by sealing fastener 326.

Figure 3C:
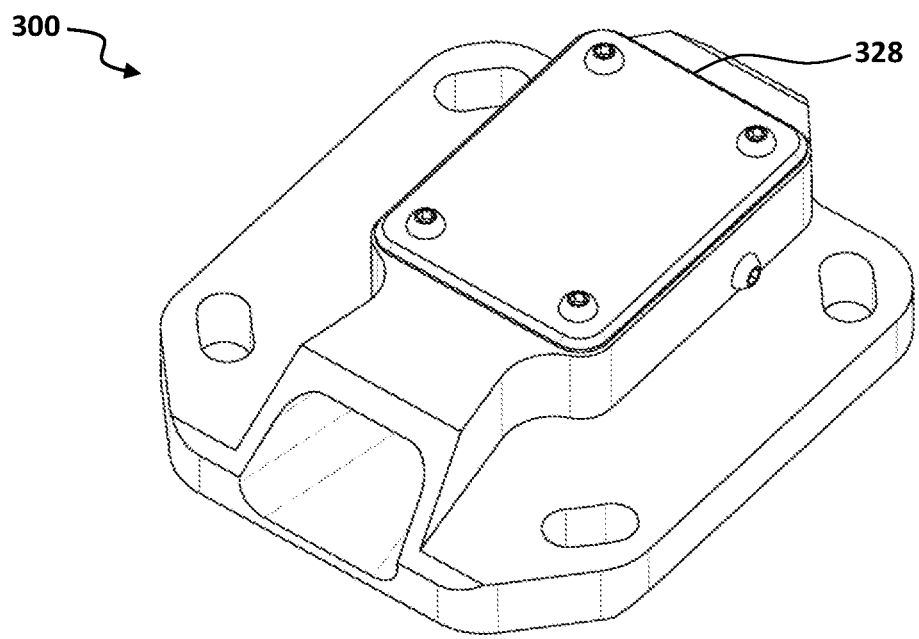
FIG. 3C is a third perspective view of the example sensor mount.

Referring to FIG. 3C, a viewing pane 328 of transparent material is secured over the viewing opening 316 into the cavity 310 to enable viewing of the display 324 while closing off the viewing opening 316. The viewing pane 328 may be made of, for example an acrylic glass. In example embodiments a seal may be provided between the viewing pane 328 and the sensor mounting portion 308. The viewing pane 328 is secured in a position such that it does not contact the find end sensor 322, in order to reduce the likelihood of any vibration induced in the viewing pane 328 being transferred thereto.

Figure 3D:
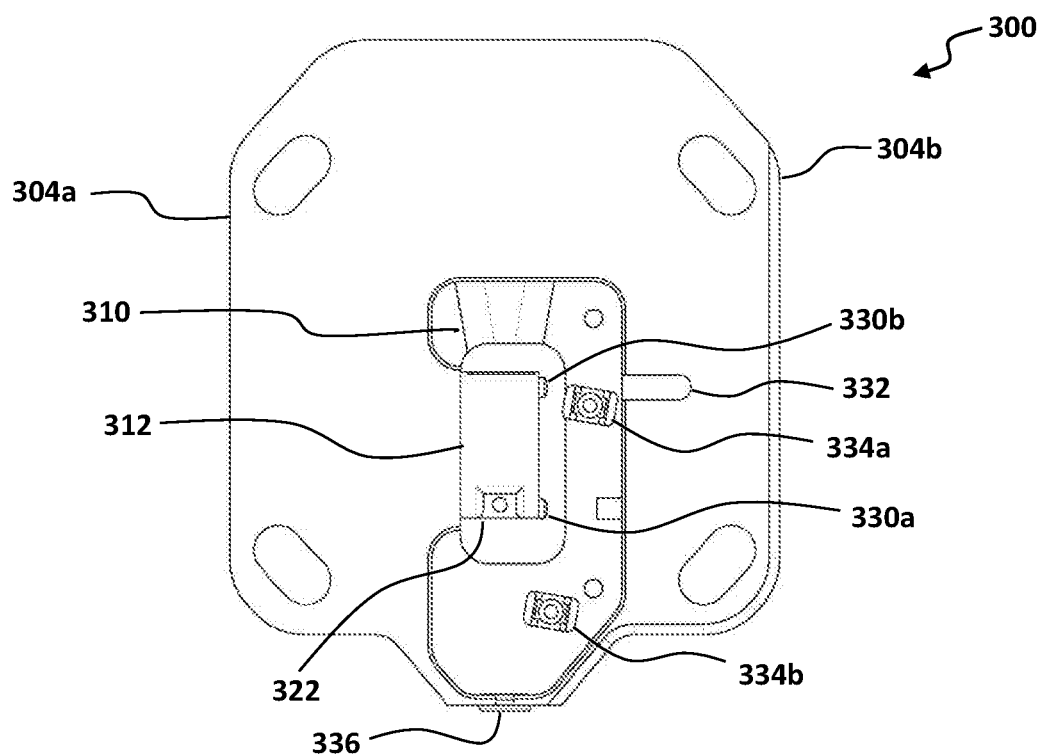
FIG. 3D is a bottom view of the example sensor mount.
Figure 3E:
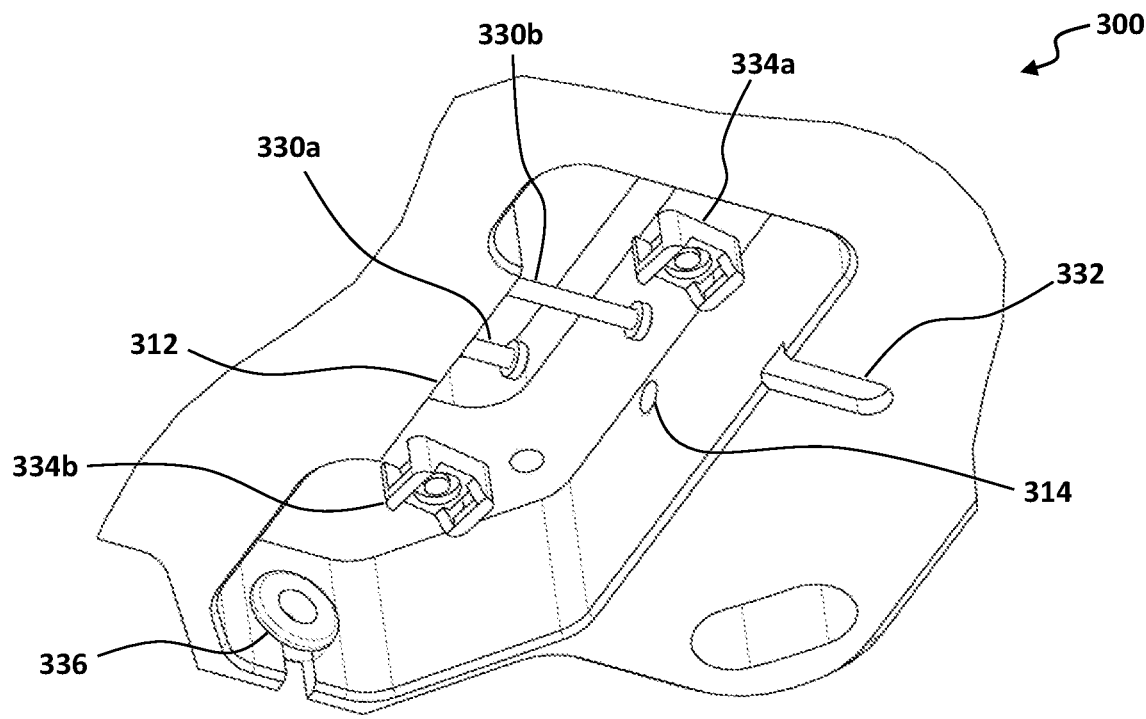
FIG. 3E is a perspective bottom view of the example sensor mount.

FIG. 3D and FIG. 3E show the underside of the sensor mount 300. The find end sensor 322 is secured directly to the sensor mounting surface 312 by passing first sensor fastener 330a and second sensor fastener 330b through the find end sensor 322 to engage the sensor mounting surface 312. Access to the first sensor fastener 330a is provided by a sensor fastener access recess 332 on the frame facing surface of the second flange 304b and intersecting the cavity 310, assisting with achieving a viable angle of a tool, such as a screwdriver, to access and drive the first sensor fastener 330a. Access to the second sensor fastener 330b is provided by fastener access aperture 314.

First connector guide 344a and second connector guide 344b are positioned in the cavity 310, to assist with locating male and female connector portions of a connector between the find end sensor 322 and a lead for connection to the control system 200—not illustrated herein. A grommet 336 is provided in a rear wall of the cavity 310 for sealing around the lead on its entry to the cavity 310.

Figure 3F:
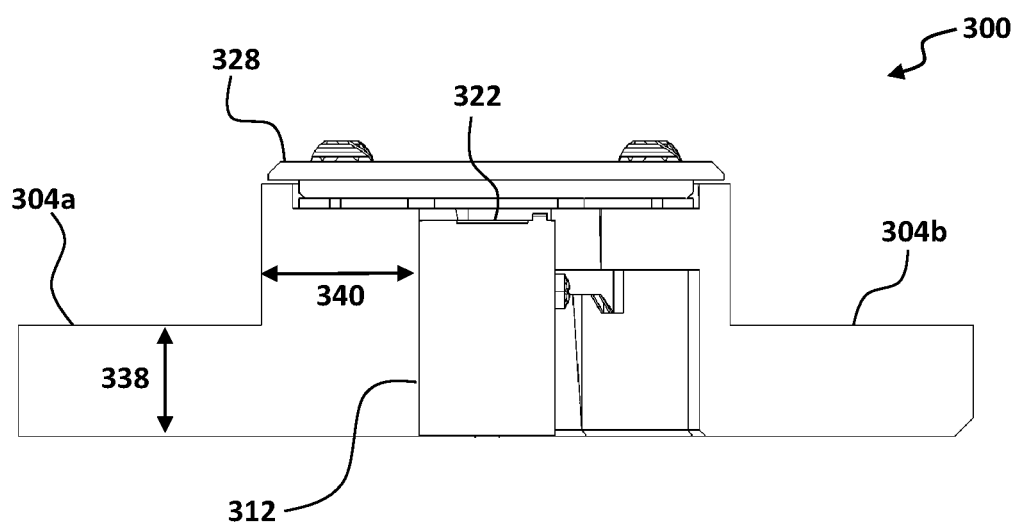
FIG. 3F is a cross-sectional end view of the example sensor mount.

Referring to FIG. 3F, the monolithic structure between the sensor mounting surface 312 and the first frame mounting aperture 306a and the second frame mounting aperture 306b of the first flange 304a ties those points directly in order to reduce the transmission of vibration to the find end sensor 322. In an example embodiment in which the sensor mount 300 is machined from aluminum, the base thickness 338 of the first flange 304a may be at least 15 mm, and more preferably in the order of 18 mm. The wall thickness 340 at the sensor mounting surface 312 may also be at least 15 mm, with this maintained through to the first frame mounting aperture 306a and the second frame mounting aperture 306b. It may also be seen that there is an air gap between the find end sensor 322 and the viewing pane 328, with the wall thickness 340 providing damping therebetween.

Figure 3G:
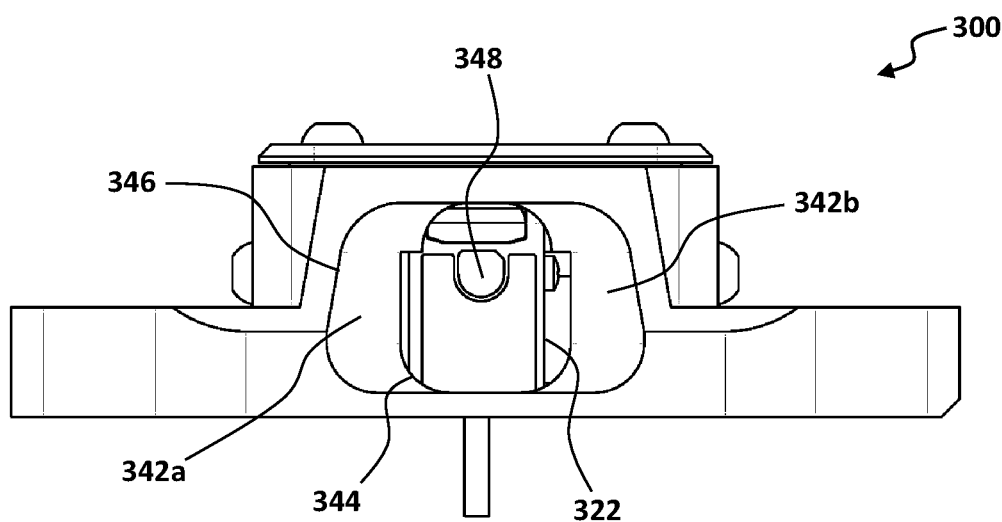
FIG. 3G is an end view of the example sensor mount.
Figure 3H:
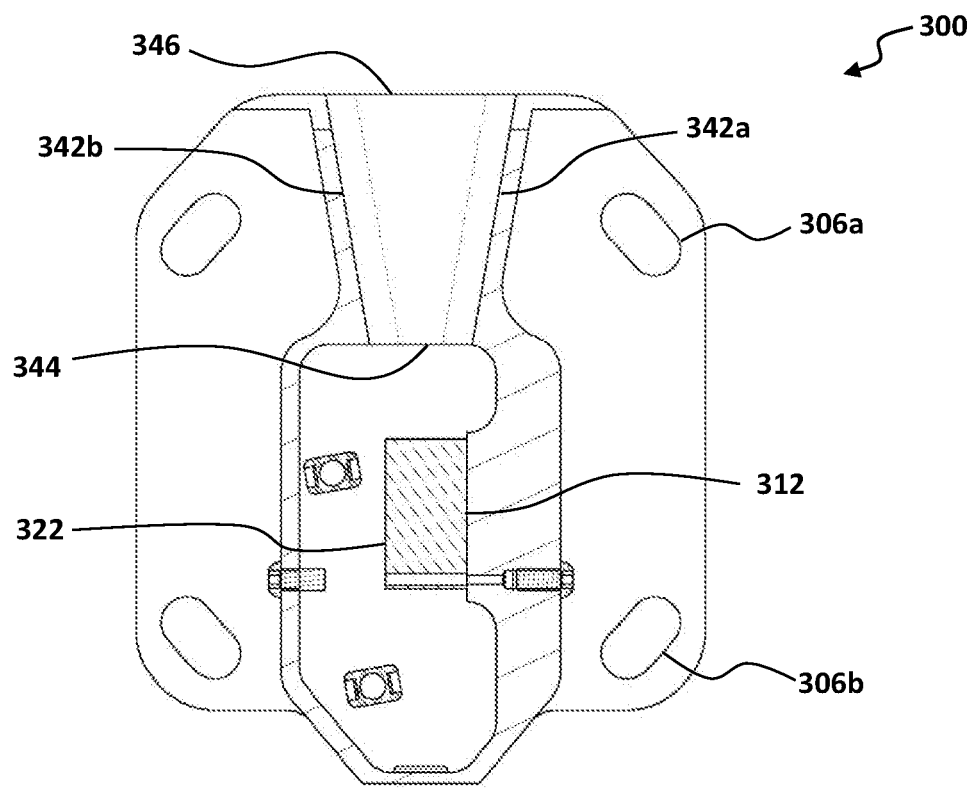
FIG. 3H is a cross-sectional top view of the example sensor mount.

Referring to FIG. 3G and FIG. 3H, first passage side surface 342a and second passage side 342b taper outwardly from an inner end 344 at the cavity 310 through to an outer end 346. A sensor window 348 of the find end sensor 322 aligns with the passage 320, such that a sensing beam may be emitted through the passage 320. The outward taper of the passage 320 is believed to reduce the rate at which the passage 320 becomes obstructed by the build-up of material from the ambient environment.

In an example embodiment a sensor mount assembly may be manufactured by producing the monolithic structure of the sensor mount 300, for example, by: machining a single piece of material, additive manufacture, casting, or molding. It should be appreciated that suitability of a particular manufacturing technique may be influenced by the material selected for manufacture of the monolithic structure. It is envisaged that the monolithic structure may be made of aluminum or an alloy thereof. However, it should be appreciated that this is not intended to be limiting, and that the monolithic structure may be manufactured from another metal material such as steel, or a plastics material.

The find end sensor 322 may then be positioned within the cavity 310 and secured to the sensor mounting surface 312 for example using first sensor fastener 330a and second sensor fastener 330b as described herein. In an example embodiment the cavity 310 may be filled by a potting compound, and in further example embodiments such a potting compound may be used to secure the find end sensor 322 within the cavity 310. In example embodiments an adhesive may be used to secure the find end sensor 322 to the sensor mounting surface 312.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

Embodiments described herein may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the embodiments described herein will be apparent to those skilled in the art. Such changes and modifications may be made without departing from the scope of the disclosure and without diminishing its attendant advantages. It is therefore intended that such changes and modifications be included within the present invention.

Embodiments have been described by way of example only and it should be appreciated that modifications and additions may be made thereto without departing from the scope thereof.

The invention claimed is:

1. A sensor mount, including:
a monolithic structure including:
a base portion configured to be secured to a frame of a timber-working device;
a sensor mounting portion including a cavity configured to receive a contactless sensor, the cavity having a sensor mounting surface for securing the contactless sensor thereto.

2. The sensor mount of claim 1, wherein the base portion and the sensor mounting portion are configured to avoid resonance with vibration induced by operation of the timber-working device.

3. The sensor mount of claim 1, wherein the base portion and the sensor mounting portion are configured to have a resonance frequency outside the range of about 500 Hz to about 1100 Hz.

4. The sensor mount of claim 1, wherein the base portion and the sensor mounting portion are configured to have a resonance frequency outside the range of about 600 Hz to about 1000 Hz.

5. The sensor mount of claim 1, wherein the monolithic structure of the sensor mount is manufactured of aluminum, or an alloy thereof.

6. The sensor mount of claim 5, wherein the monolithic structure is manufactured of 6000 series aluminum alloy.

7. The sensor mount of claim 6, wherein the monolithic structure is manufactured of aluminum alloy 6062.

8. The sensor mount of claim 1, wherein the base portion of the sensor mount includes a first flange to one side of the cavity, and a second flange to the other side of the cavity.

9. The sensor mount of claim 1, wherein the thickness of the monolithic structure at the base portion is at least 10 mm.

10. The sensor mount of claim 1, wherein the monolithic structure includes a passage from the cavity to an external surface of the sensor mount.

11. The sensor mount of claim 10, wherein at least the side surfaces of the passage taper outwardly from the cavity.

12. The sensor mount of claim 1, including a sensor fastener access recess on a frame facing surface of the base portion and intersecting the cavity, configured to assist with positioning a tool to access and drive a fastener used to secure the sensor to the sensor mounting surface.

13. The sensor mount of claim 1, including a sensor fastener access aperture through the sensor mounting portion into the cavity, configured to assist with positioning a tool to access a fastener used to secure the sensor to the sensor mounting surface.

14. The sensor mount of claim 1, including a transparent portion permitting viewing of the sensor mounting surface.

15. A sensor assembly, including:
a contactless sensor; and
a sensor mount including a monolithic structure, the monolithic structure including:
a base portion configured to be secured to a frame of a timber-working device; and
a sensor mounting portion including a cavity configured to receive the contactless sensor, the cavity having a sensor mounting surface, wherein the contactless sensor is secured to the sensor mounting surface.

16. The sensor assembly of claim 15, wherein the sensor is a laser distance sensor.

17. The sensor assembly of claim 15, wherein the contactless sensor has an axis of loading most vulnerable to the effects of vibration induced by operation of a timber-working device to which the sensor assembly is to be secured, and the contactless sensor is secured within the cavity such that the most vulnerable axis of loading of the sensor is perpendicular to a feed axis of the timber-working device.

18. The sensor assembly of claim 15, wherein the sensor is secured directly to the sensor mounting surface.

19. The sensor assembly of claim 18, wherein an entire side of the sensor bears against the sensor mounting surface when secured thereto.

20. A timber-working device, including:
- a frame;
- a feed mechanism configured to feed at least one stem relative to the frame;
- a sensor assembly including:
  - a contactless sensor; and
  - a sensor mount including a monolithic structure, the monolithic structure including:
  - a base portion configured to be secured to the frame; and
  - a sensor mounting portion including a cavity configured to receive the contactless sensor, the cavity having a sensor mounting surface, wherein the contactless sensor is secured to the sensor mounting surface,
- wherein the sensor assembly is mounted to the frame such that a sensing path of the sensor projects into a feed path of the feed mechanism.

* * * * *